United States Patent
Jung et al.

(10) Patent No.: US 7,364,597 B2
(45) Date of Patent: Apr. 29, 2008

(54) METAL COMPLEX COLORANT COMPRISING AZO MOIETY

(75) Inventors: Yeon-kyoung Jung, Suwon-si (KR); Seung-min Ryu, Yongin-si (KR); Kyung-hoon Lee, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 539 days.

(21) Appl. No.: 10/912,544

(22) Filed: Aug. 6, 2004

(65) Prior Publication Data

US 2005/0059813 A1 Mar. 17, 2005

(30) Foreign Application Priority Data

Aug. 8, 2003 (KR) .................. 10-2003-0055022

(51) Int. Cl.
*C09D 11/00* (2006.01)
*C09B 45/04* (2006.01)

(52) U.S. Cl. ............... 8/639; 8/674; 8/681; 8/685; 106/31.51; 106/31.52; 534/654; 534/655; 534/656; 534/684; 534/692; 534/693; 534/714; 534/715; 534/716; 534/717; 534/718

(58) Field of Classification Search ............ 534/654, 534/655, 656, 684, 692, 693, 714, 715, 716, 534/717, 718; 8/639, 674, 681, 685; 106/31.51, 106/31.52
See application file for complete search history.

(56) References Cited

U.S. PATENT DOCUMENTS

| | | | | |
|---|---|---|---|---|
| 2,729,629 A | * | 1/1956 | Wolfgang et al. | 534/591 |
| 2,824,093 A | * | 2/1958 | Jakob et al. | 534/655 |
| 2,842,536 A | * | 7/1958 | Bauer et al. | 534/693 |
| 3,705,888 A | * | 12/1972 | Lewis et al. | 534/693 |
| 3,728,328 A | * | 4/1973 | Lienhard et al. | 534/693 |
| 3,878,158 A | * | 4/1975 | Brouard et al. | 524/159 |
| 4,008,211 A | | 2/1977 | Lienhard et al. | |
| 4,218,367 A | | 8/1980 | Brouard et al. | |
| 4,481,141 A | * | 11/1984 | Evans | 534/700 |
| 5,001,227 A | | 3/1991 | Schutz et al. | |
| 5,095,100 A | | 3/1992 | Ono et al. | |
| 5,166,326 A | | 11/1992 | Smith et al. | |
| 5,180,705 A | | 1/1993 | Smith et al. | |
| 5,314,998 A | * | 5/1994 | Smith et al. | 534/701 |
| 7,157,563 B2 | * | 1/2007 | Smith | 534/649 |

FOREIGN PATENT DOCUMENTS

| | | | |
|---|---|---|---|
| EP | 135272 | * | 3/1985 |
| EP | 0 947 563 A1 | | 6/1999 |
| JP | 11-061015 | | 3/1999 |
| JP | 11-343437 | | 12/1999 |
| JP | 2002-275382 | | 9/2002 |
| WO | WO-00/67069 | * | 11/2000 |

OTHER PUBLICATIONS

Akimova et al., Chemical Abstracts, 106:34614, 1987.*
Blus, Chemical Abstracts, 130:26119, 1998.*
U.S. Appl. No. 10/912,562, filed Aug. 6, 2004, Kyung-hoon Lee et al., Samsung Electronics Co., Ltd.

* cited by examiner

*Primary Examiner*—Fiona T Powers
(74) *Attorney, Agent, or Firm*—Staas & Halsey LLP

(57) ABSTRACT

A metal complex colorant represented by formula 1 may embody various colors and has improved fastness, such as light resistance, water resistance and the like:

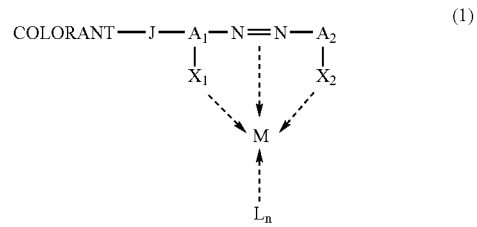

wherein each of $A_1$ and $A_2$ is independently a moiety which includes a substituted or unsubstituted $C_2$-$C_{30}$ alkenylene group having at least one double bond and is conjugated with an azo group; each of $X_1$ and $X_2$ is selected from the group consisting of a hydroxy group, a $C_1$-$C_4$ alkoxy group, a carboxyl group, and a substituted or unsubstituted amino group; M is a polyvalent transition metal; L is a neutral or anionic ligand; n is an integer from 1 to 3; and J is a linker. The metal complex colorant may be used in various fields employing colors, such as fibers, foods, drugs, cosmetics, coatings, inks or ceramics.

28 Claims, No Drawings

METAL COMPLEX COLORANT COMPRISING AZO MOIETY

CROSS-REFERENCE TO RELATED APPLICATIONS

This application claims the benefit of Korean Patent Application No. 2003-55022, filed on Aug. 8, 2003, in the Korean Intellectual Property Office, the disclosure of which is incorporated herein in its entirety by reference.

BACKGROUND OF THE INVENTION

1. Field of the Invention

The present invention relates to a metal complex colorant comprising an azo moiety, and more particularly, to a metal complex colorant which may embody various colors and have effective fastness, such as light resistance, water resistance and the like.

2. Description of the Related Art

In general, colorant are substances which exhibit inherent colors by selectively absorbing and reflecting visible light. Colorants are used in various fields embodying colors, such as fibers, foods, drugs, cosmetics, coatings, ink for inkjet printers or printing, pigmenting plastics or rubbers, manufacturing furniture, textile printing, and making papers or ceramics.

Colorant are classified into dyes and pigments. Dyes are colorful substances that may be dissolved in water or oil and dispersed as single molecules, and may bind to molecules such as fibers for dyeing. Pigments are substances that do not dissolve in water or oil and form an opaque colorful film in the form of a powder on a surface of a material.

In general, dyes may have a wide range of colors that are bright and vivid. However, dyes are not light/water resistant, i.e., they may be bleached/discolored by light or may be diluted by water or organic solvents. On the other hand, pigments have more effective light/water resistance than dyes. However, pigments have a narrower range of colors than dyes. Thus, much research has been conducted to enhance light and water resistance, and the like, of dyes, without reducing the variety of colors of dyes. One such dye includes a metal complex.

U.S. Pat. No. 5,095,100 discloses a method of producing a metal complex dye having an improved light resistance by forming coordinate bonds between metal and an azo group and a specific functional group in the dye molecule. However, the method requires the presence of the azo group and the specific functional group in the dye molecule, thus limiting the types of the colorants to which the method may be applied.

SUMMARY OF THE INVENTION

The present invention provides a metal complex colorant comprising an azo moiety.

The present invention also provides a colorant composition comprising the metal complex colorant.

According to an aspect of the present invention, a self-dispersible metal complex colorant is represented by formula 1, in which an azo moiety is attached to a colorant, and coordinate bonds are formed between the azo moiety and a metal:

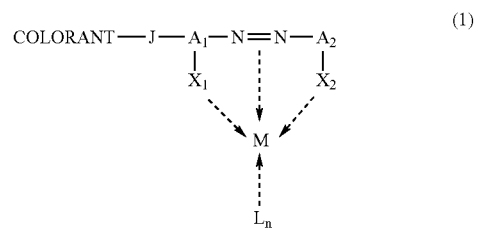

wherein each of $A_1$ and $A_2$ is independently a moiety which includes a substituted or unsubstituted $C_2$-$C_{30}$ alkenylene group having at least one double bond and is conjugated with an azo group;

each of $X_1$ and $X_2$ is selected from the group consisting of a hydroxy group, a $C_1$-$C_4$ alkoxy group, a carboxyl group, and a substituted or unsubstituted amino group;

M is a polyvalent transition metal;

L is a neutral or anionic ligand;

n is an integer between 1 and 3; and

J is a linker.

The metal complex colorant represented by formula 1 may be one of those represented by formulas 2 and 3:

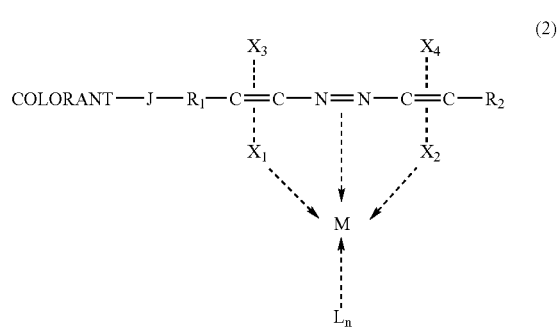

wherein J, $X_1$, $X_2$, M, L and n are defined as above;

$R_1$ is selected form the group consisting of a substituted or unsubstituted $C_1$-$C_{20}$ alkylene group, a substituted or unsubstituted $C_1$-$C_{20}$ heteroalkylene group, a substituted or unsubstituted $C_2$-$C_{20}$ alkenylene group, a substituted or unsubstituted $C_2$-$C_{20}$ heteroalkenylene group, a substituted or unsubstituted $C_6$-$C_{30}$ arylene group, and a substituted or unsubstituted $C_6$-$C_{30}$ heteroarylene group;

each of $X_3$, $X_4$ and $R_2$ is independently selected from the group consisting of a hydrogen, a halogen atom, a hydroxy group, a carboxyl group, a substituted or unsubstituted amino group, a sulfonic acid group, a phosphoric acid group, a substituted or unsubstituted $C_1$-$C_{20}$ alkyl group, a substituted or unsubstituted $C_1$-$C_{20}$ heteroalkyl group, a substituted or unsubstituted $C_2$-$C_{20}$ alkenyl group, a substituted or unsubstituted $C_2$-$C_{20}$ heteroalkenyl group, a substituted or unsubstituted $C_6$-$C_{30}$ aryl group, and a substituted or unsubstituted $C_6$-$C_{30}$ heteroaryl group.

A metal complex colorant according to an embodiment of the present invention is represented by formula 1.

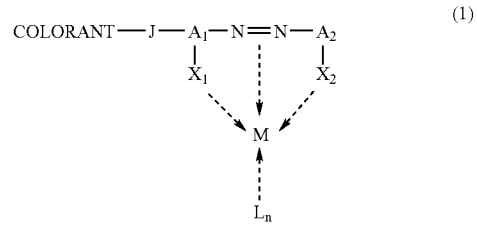

(1)

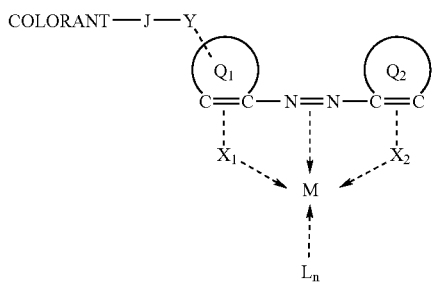

(3)

wherein $X_1$, $X_2$, M, J, L and n are defined as above;

each of $Q_1$ and $Q_2$ is independently selected from the group consisting of a substituted or unsubstituted $C_2$-$C_{20}$ cycloalkenylene group, a substituted or unsubstituted $C_6$-$C_{30}$ arylene group, a substituted or unsubstituted $C_2$-$C_{30}$ heterocycloalkenylene group, and a substituted or unsubstituted $C_4$-$C_{30}$ heteroarylene group, which has at least one double bond;

Y is selected from the group consisting of —O—, —S—, —P—, a carboxyl group, a substituted or unsubstituted amino group, a sulfonic acid group, a phosphoric acid group, a substituted or unsubstituted $C_1$-$C_{20}$ alkyl group, a substituted or unsubstituted $C_1$-$C_{20}$ heteroalkyl group, a substituted or unsubstituted $C_2$-$C_2$ alkenyl group, a substituted or unsubstituted $C_2$-$C_{20}$ heteroalkenyl group, a substituted or unsubstituted $C_6$-$C_{30}$ aryl group, and a substituted or unsubstituted $C_6$-$C_{30}$ heteroaryl group.

According to another aspect of the present invention, a composition comprises the metal complex colorant represented by formula 1, a carrier medium and/or an additive.

Additional aspects and/or advantages of the invention will be set forth in part in the description which follows and, in part, will be obvious from the description, or may be learned by practice of the invention.

DETAILED DESCRIPTION OF THE PREFERRED EMBODIMENTS

Reference will now be made in detail to the embodiments of the present invention, examples of which are illustrated in the accompanying drawings, wherein like reference numerals refer to the like elements throughout. The embodiments are described below to explain the present invention by referring to the figures.

Hereinafter, the present invention will be described in detail. In general, a colorant includes a carboxylic acid group, a sulfonic acid group, a hydroxy group, an amino group, a phosphoric acid and the like. If an azo moiety containing in its surface a functional group capable of reacting with one of the above groups contained in the colorant is reacted with the colorant, the azo moiety may connect to the colorant via an ester bond or an amide bond or the like. The azo moiety reacts with a metal to form a metal complex. By forming the metal complex, fastness may be improved, such as light resistance, water resistance, and the like, of the colorant and various colors may be embodied.

wherein each of $A_1$ and $A_2$ is independently a moiety which includes a substituted or unsubstituted $C_2$-$C_{30}$ alkenylene group having at least one double bond and is conjugated with an azo group;

each of $X_1$ and $X_2$ is selected from the group consisting of a hydroxy group, a $C_1$-$C_4$ alkoxy group, a carboxyl group, and a substituted or unsubstituted amino group;

M is a polyvalent transition metal;

L is a neutral or anionic ligand;

n is an integer between 1 and 3; and

J is a linker.

In the metal complex colorant represented by formula 1, each of $A_1$ and $A_2$ is a moiety which includes a $C_2$-$C_{30}$ alkenylene group, preferably a $C_2$-$C_{15}$ alkenylene group, and may be in the form of a cyclic or an acyclic system. In the case of a cyclic system, the moiety may be aromatic or non-aromatic.

$A_1$ and $A_2$ are respectively connected to the substituents $X_1$ and $X_2$, which may be bonded to a metal. Each of $X_1$ and $X_2$ may be independently a hydroxy group, a $C_1$-$C_4$ alkoxy group, a carboxyl group, or an amino group or the like, In the metal complex colorant represented by formula 1, M is a polyvalent transition metal having an oxidation number of +1 to +5. Examples of the polyvalent transition metal include aluminum, gold, cerium, cobalt, chromium, copper, europium, iron, potassium, germanium, indium, lanthanum, manganese, nickel, palladium, platinum, rhodium, ruthenium, scandium, silicon, samarium, titanium, uranium, zinc, zirconium, and the like, and preferably nickel, copper, zinc, iron, chromium, palladium, platinum, and cobalt.

In the metal complex colorant represented by formula 1, the neutral ligand may be a monodentate ligand, a bidentate ligand, a trimonodentate ligand or the like. Specific examples of the neutral ligand include ammonia, water, triphenylphospine, *NH2R"NH2*(wherein R" is a substituted or unsubstituted $C_1$-$C_{20}$ alkylene group, a substituted or unsubstituted $C_1$-$C_{20}$ heteroalkylene group, a substituted or unsubstituted $C_6$-$C_{30}$ arylene group, or a substituted or unsubstituted $C_4$-$C_{30}$ heteroarylene group), 2,2'-bipyridine, 1,10-phenanthroline, and 2,2',2"-terpyridine.

The neutral ligand used in the present embodiment is not charged before it is attached to the polyvalent transition metal M. After attachment to the polyvalent transition metal, the neutral ligand may be hydrophobic.

In the metal complex colorant represented by formula 1, the anionic ligand has a charge of −1 to −6 and may be at least one selected from the group consisting of a halogen atom ion (F⁻, Cl⁻, Br⁻, I⁻), R"—NO₃* (wherein R" is selected from the group consisting of a substituted or unsubstituted $C_1$-$C_{20}$ alkyl group, a substituted or unsubstituted $C_1$-$C_{20}$ heteroalkyl group, a substituted or unsubstituted $C_6$-$C_{30}$ aryl, and a substituted or unsubstituted $C_4$-$C_{30}$ heteroaryl group), a substituted or unsubstituted $C_1$-$C_{20}$ alkylcarboxylate ion (such as acetate and trifluoroacetate), R"CN*(wherein R" is selected from the group consisting of a substituted or unsubstituted $C_1$-$C_{20}$ alkyl group, a substituted or unsubstituted $C_1$-$C_{20}$ heteroalkyl group, a substituted or unsubstituted $C_6$-$C_{30}$ aryl group, a substituted or unsubstituted $C_4$-$C_{20}$ heteroaryl group, and —(CH$_2$CH$_2$O)$_z$— (wherein Z is a number between 1 and 50), R"OO* (wherein R" is selected from the group consisting of a substituted or unsubstituted $C_1$-$C_{20}$ alkyl group, a substituted or unsubstituted $C_1$-$C_{20}$ heteroalkyl group, a substituted or unsubstituted $C_6$-$C_{30}$ aryl group, and a substituted or unsubstituted $C_4$-$C_{20}$ heteroaryl group), R"O* (wherein R" is selected from the group consisting of a substituted or unsubstituted $C_1$-$C_{20}$ alkyl group, a substituted or unsubstituted $C_1$-$C_{20}$ heteroalkyl group, a substituted or unsubstituted $C_6$-$C_{30}$ aryl group, and a substituted or unsubstituted $C_4$-$C_{20}$ heteroaryl group), R"SCN* (wherein R" is selected from the group consisting of a substituted or unsubstituted $C_1$-$C_{20}$ alkyl group, a substituted or unsubstituted $C_1$-$C_{20}$ heteroalkyl group, a substituted or unsubstituted $C_6$-$C_{30}$ aryl group, and a substituted or unsubstituted $C_4$-$C_{20}$ heteroaryl group), R"N$_3$* (wherein R" is selected from the group consisting of a substituted or unsubstituted $C_1$-$C_{20}$ alkyl group, a substituted or unsubstituted $C_1$-$C_{20}$ heteroalkyl group, a substituted or unsubstituted $C_6$-$C_{30}$ aryl group, and a substituted or unsubstituted $C_4$-$C_{20}$ heteroaryl group), R"CO$_3$* (wherein R" is selected from the group consisting of a substituted or unsubstituted $C_1$-$C_{20}$ alkyl group, a substituted or unsubstituted $C_1$-$C_{20}$ heteroalkyl group, a substituted or unsubstituted $C_6$-$C_{30}$ aryl group, and a substituted or unsubstituted $C_4$-$C_{20}$ heteroaryl group), and R"SO$_4$* (wherein R" is selected from the group consisting of a substituted or unsubstituted $C_1$-$C_{20}$ alkyl group, a substituted or unsubstituted $C_1$-$C_{20}$ heteroalkyl group, a substituted or unsubstituted $C_6$-$C_{30}$ aryl group, and a substituted or unsubstituted $C_4$-$C_{20}$ heteroaryl group).

The anionic ligand used in the present embodiment is negatively charged before it is attached to the polyvalent transition metal M. After attachment to the polyvalent transition metal, the anionic neutral ligand may be hydrophobic.

In the metal complex colorant represented by formula 1, J is a linker connecting the azo group to the colorant. The linker may be formed when chemically bonding the azo group to the colorant or by chemically bonding the linker to the colorant and then bonding the azo group to the linker. Examples of the linker include —O—, —NR—, —N=N—, —S—, —P—, —C(=O)—NR—, —NR—C(=O)—, —S(=O)(=O)O—, —C(=O)O—, —O—C(=O)—, —P(=O)O—, —C(=O)—O—C(=O)—, —C(=O)—S—C(=O)—, —C(=O)—NR—C(=O)—, —C(=N)—O—C(=N)—, —C(=S)—O—C(=S)—, —C(=N)—NR—C(=N)—, —C(=S)—NR—C(=S)—, —C(=N)—S—C(=N)—, —C(=S)—S—C(=S)— (wherein R is a hydrogen or a substituted or unsubstituted $C_1$-$C_4$ alkyl group), and a chemical bond, for example, a single bond, a double bond, or the like.

When each of A$_1$ and A$_2$ in the metal complex colorant represented by formula 1 is an acyclic system, the metal complex colorant may be represented by formula 2.

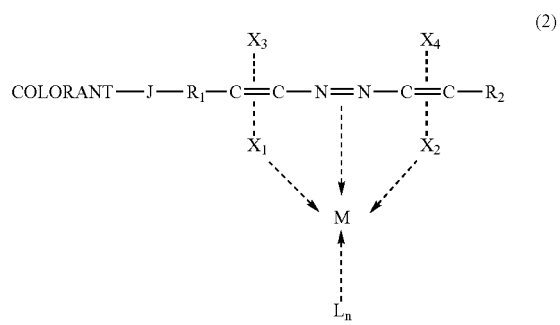

(2)

wherein J, X$_1$, X$_2$, M, L and n are defined as above,

R$_1$ is selected from the group consisting of a substituted or unsubstituted $C_1$-$C_{20}$ alkylene group, a substituted or unsubstituted $C_1$-$C_{20}$ heteroalkylene group, a substituted or unsubstituted $C_2$-$C_{20}$ alkenylene group, a substituted or unsubstituted $C_2$-$C_{20}$ heteroalkenylene group, a substituted or unsubstituted $C_6$-$C_{30}$ arylene group, and a substituted or unsubstituted $C_6$-$C_{30}$ heteroarylene group, each of X$_3$, X$_4$ and R$_2$ is independently selected from the group consisting of a hydrogen atom, a halogen atom, a hydroxy group, a carboxyl group, a substituted or unsubstituted amino group, a sulfonic acid group, a phosphoric acid group, a substituted or unsubstituted $C_1$-$C_{20}$ alkyl group, a substituted or unsubstituted $C_1$-$C_{20}$ heteroalkyl group, a substituted or unsubstituted $C_2$-$C_{20}$ alkenyl group, a substituted or unsubstituted $C_2$-$C_{20}$ heteroalkenyl group, a substituted or unsubstituted $C_6$-$C_{30}$ aryl group, and a substituted or unsubstituted $C_6$-$C_{30}$ heteroaryl group.

In the metal complex colorant represented by formula 2, A$_1$ and A$_2$, which are adjacent to the azo group, are each acyclic conjugated systems. In formula 2, each of X$_1$ and X$_2$ is adjacent to the azo group and connected to one of the double-bonded carbon atoms, and forms a coordinate bond with a center metal M, respectively.

The metal complex colorant having formula 1 in which an alkylene group-containing moiety adjacent to the azo group has a cyclic system is represented by formula 3:

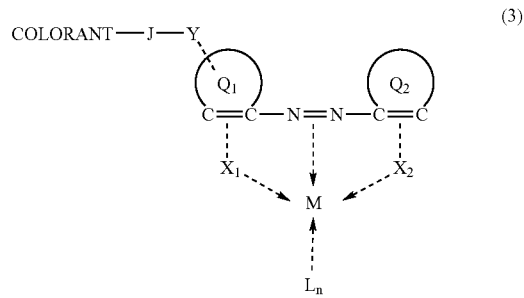

(3)

wherein X$_1$, X$_2$, M, J, L and n are defined as above, each of Q$_1$ and Q$_2$ has at least one double bond, and is independently selected from the group consisting of a substituted or unsubstituted $C_2$-$C_{20}$ cycloalkenylene group, a substituted or unsubstituted $C_6$-$C_{30}$ arylene group, a substituted or unsubstituted $C_2$-$C_{30}$ heterocycloalkenylene group, and a substituted or unsubstituted $C_4$-$C_{30}$ heteroarylene group; and Y is selected from the group consisting of —O—, —S—, —P—, a carboxyl group, a substituted or unsubstituted amino group, a sulfonic acid group, a phosphoric acid group, a substituted or unsubstituted $C_1$-$C_{20}$ alkyl group, a substituted or unsubstituted $C_1$-$C_{20}$ heteroalkyl group, a substituted or unsubstituted $C_2$-$C_{20}$ alkenyl group, a substituted or unsubstituted $C_2$-$C_{20}$ heteroalkenyl group, a substituted or unsubstituted $C_6$-$C_{30}$ aryl group, and a substituted or unsubstituted $C_6$-$C_{30}$ heteroaryl group.

In the metal complex colorant represented by formula 3, $A_1$ and $A_2$ have cyclic systems. Each of the cyclic systems includes an alkenylene group adjacent to the azo group. Each of the cyclic systems may be an aromatic or non-aromatic system. Each of the cyclic systems may be a 4 to 8 member cyclic system and may be substituted with a suitable substituent. The cyclic system may be a polycyclic system, such as bicycle or tricycle. Each ring in the polycyclic system may be fused to form a fused ring. The cyclic system is mono- or poly-substituted. When poly-substitued, the substituents consist of identical or different substituents, for example, a hydrogen atom, a halogen atom, a hydroxy group, a carboxyl group, a substituted or unsubstituted amino group, a sulfonic acid group, a phosphoric acid group, a substituted or unsubstituted $C_1$-$C_{20}$ alkyl group, a substituted or unsubstituted $C_1$-$C_{20}$ heteroalkyl group, a substituted or unsubstituted $C_2$-$C_{20}$ alkenyl group, a substituted or unsubstituted $C_2$-$C_{20}$ heteroalkenyl group, a substituted or unsubstituted $C_6$-$C_{30}$ aryl group, or a substituted or unsubstituted $C_6$-$C_{30}$ heteroaryl group.

The metal complex colorants having formulas 1 through 3 according to embodiments of the present invention are obtained by forming a general chemical bond, for example, an ester bond or an amide bond, between a functional group generally included in a colorant such as a carboxylic acid group, a sulfonic acid group, a hydroxy group, an amino group, a phosphoric acid group or the like, and a functional group included in its surface of an azo moiety to introduce an azo moiety into the colorant and then forming coordinate bonds between the azo moiety and a metal and between the neutral or anionic ligand and the metal.

Colorants that may be bonded with an azo moiety in embodiments of the present invention include, but are not limited to, a conventional dye or pigment containing an amino group, a carboxyl group, a hydroxyl group, a phosphoric acid group or a sulfonic acid group in the molecule and a colorant into which one of the above groups may be introduced via a conventional reaction.

Specific examples of the dye include C.I. DIRECT BLACK 9, 17, 19, 22, 32, 56, 91, 94, 97, 166, 168, 174, 199, C.I. DIRECT BLUE 1, 10, 15, 22, 77, 78, 80, 200, 201, 202, 203, 207, 211, C.I. DIRECT RED 2, 4, 9, 23, 31, 39, 63, 72, 83, 84, 89, 111, 173, 184, 240, C.I. DIRECT YELLOW 8, 9, 11, 12, 27, 28, 29, 33, 35, 39, 41, 44, 50, 53, 58 and the like. Specific examples of the pigment include carbon black, graphite, vitreous carbon, activated charcoal, activated carbon, anthraquinone, phthalocyanin blue, phthalocyanin green, diazos, monoazos, pyranthrones, perylene, quinacridone, indigoid pigments and the like.

The metal complex colorant represented by formula 1 may be used in various applications such as fibers, lather, fur, foods, drugs, cosmetics, coatings, ink for inkjet printers or printing, pigmenting plastics or rubbers, manufacturing furniture, textile printing, making papers or ceramics, and the like. A composition according to anther embodiment of the present invention comprises the metal complex colorant represented by formula 1, a carrier medium and/or an additive.

Hereinafter, an ink composition according to an exemplary embodiment of the present invention will be specifically described. This exemplary embodiment is not meant to limit the scope of the present invention.

An ink composition according to an exemplary embodiment of the present invention includes 1 to 20 parts by weight, preferably 1 to 10 parts by weight of the metal complex colorant presented by formula 1 based on 100 parts by weight of the ink composition.

According to another exemplary embodiment of the present invention, an ink composition comprises a conventional colorant and the metal complex colorant represented by formula 1 as a colorant component. That is, the ink composition comprises a mixture of a conventional colorant and the metal complex colorant represented by formula 1, and a carrier medium and/or an additive.

The ink composition of the present embodiment includes 1 to 15 parts by weight of the conventional colorant and 1 to 15 parts by weight of the metal complex colorant based on 100 parts by weight of the ink composition, and the total concentration of the conventional colorant and the metal complex colorant may be in a range of 2 to 20 parts by weight based on 100 parts by weight of the ink composition. The total concentration of the conventional colorant and the metal complex colorant may preferably be in a range of 2 to 10 parts by weight based on 100 parts by weight of the ink composition In the ink compositions according to the exemplary embodiments of the present invention, the conventional colorant and the metal complex colorant may be dissolved or dispersed in a carrier medium.

The carrier medium may be water, at least one organic solvent, or a mixture of 5 to 50 parts by weight of at least one organic solvent and 50 to 95 parts by weight of water. The amounts of water and the organic solvent depend on various factors, for example, characteristics of the ink composition such as viscosity, surface tension, drying speed and the like. Also, the characteristics of the ink depend on methods of printing the ink and the type of substrates on which the ink is printed.

The organic solvent used in the carrier medium may be selected from the group consisting of alcohol compounds, such as methyl alcohol, ethyl alcohol, n-propyl alcohol, isopropyl alcohol, n-butyl alcohol, sec-butyl alcohol, t-butyl alcohol or isobutyl alcohol; aliphatic ketone compounds, such as acetone, methyl ethyl ketone, diethyl ketone or diacetone alcohol; ester compounds, such as methyl acetate, ethyl acetate or ethyl lactate; polyvalent alcohol compounds, such as ethylene glycol, diethylene glycol, triethylene glycol, propylene glycol, butylene glycol, 1,4-butane diol, 1,2,4-butane triol, 1,5-pentane diol, 1,2,6-hexane triol, hexylene glycol, glycerol, glycerol ethoxylate or trimethylolpropane ethoxylate; ether compounds, such as ethylene glycol monomethyl ether, ethylene glycol monoethyl ether, diethylene glycol methyl ether, diethylene glycol ethyl ether, triethylene glycol monomethyl ether or triethylene glycol monoethyl ether; nitrogen-containing compounds, such as 2-pyrolidone or N-methyl-2-pyrolidone; and sulfur-containing compounds, such as dimethyl sulfoxide, tetramethylsulfone or thioglycol.

The ink composition according to the exemplary embodiments of the present invention may further comprise at least one additive selected from the group consisting of a dispersing agent, a viscosity control agent, a surfactant, a storage stabilizer, a wetting agent, a pH control agent, and penetrant.

If the colorant is a dye which is insoluble in water or a pigment, at least one dispersing agent may be added to the ink composition to improve a dispersion stability of the colorant in the ink composition. Any dispersing agent may be used in the ink composition according to the present embodiment. That is, a low molecular weight dispersing agent which has a relatively simple structure, as well as a high molecular weight dispersing agent which has a relatively complicated structure, such as a block copolymer, may be used in the ink composition.

Examples of the low molecular weight dispersing agent which has a relatively simple structure include, but are not limited to, polyvinyl alcohol (PVA), cellulosics, ethylene oxide modified phenols, ethylene oxide/propylene oxide polymer, a solution of sodium polyacrylate (TEGO, DISPERSE 715W), a solution of modified polyacryl resin (TEGO, DISPERSE 735W), a solution of an alkylolammonium salt of a lower molecular weight polycarboxylic acid polymer (BYK-CHEMIE, DISPERBYK), a solution of an alkylolammonium salt of a polyfunctional polymer (BYK-CHEMIE, DISPERBYK-181), and mixtures thereof.

Examples of the high molecular weight dispersing agent which has a relatively complicated structure include, but are not limited to, siloxanes, such as polyether siloxane copolymer (TEGO, WET KL 245/WET 260); hydrophilic polymers having a structure of AB or BAB (wherein A is a hydrophobic homopolymer or copolymer of a substituted or unsubstituted $C_1$-$C_{30}$ acrylic monomer and B is a hydrophilic homopolymer or copolymer of a substituted or unsubstituted $C_1$-$C_{30}$ acrylic monomer). Specific examples include acrylic acid/acrylate copolymer, a methacrylic acid/methacrylate copolymer, an acrylic acid/polydialkylsiloxane/acrylate block copolymer, and mixtures thereof.

The ink composition, according to the exemplary embodiments of the present invention, may include 1 to 20 parts by weight of the dispersing agent based on 100 parts by weight of the ink composition.

The viscosity control agent controls the viscosity of the ink composition to facilitate effective spraying characteristics. Examples of the viscosity control agent include casein, hydroxymethylcellulose, hydroxyethylcellulose, and carboxymethylcellulose. The concentration of the viscosity control agent may be in a range of 0.1 to 5.0 parts by weight based on 100 parts by weight of the ink composition.

The surfactant controls the surface tension of the ink composition to stabilize a jetting performance at the nozzles. An anionic surfactant, a cationic surfactant or a non-ionic surfactant may be used as the surfactant.

Examples of the anionic surfactant include $C_1$-$C_{1000}$ alkylcarboxylates (preferably, $C_{10}$-$C_{200}$ alkylcarboxylates), $C_1$-$C_{1000}$ alcohol sulfonic acid ester salts (preferably, $C_{10}$-$C_{200}$ alcohol sulfonic acid ester salts), $C_1$-$C_{1000}$ alkylsufonates (preferably, $C_{10}$-$C_{200}$ alkylsufonates), $C_1$-$C_{1000}$ alkylbenzenesulfonates (preferably, $C_{10}$-$C_{200}$ alkylbenzenesulfonates), and mixtures thereof.

Examples of the cationic surfactant include salts of fatty acid amine, quaternary ammonium salts, sulfonium salts, phosphonium salts, and mixtures thereof.

Examples of the non-ionic surfactant include polyoxyethylene alkyl ether (wherein alkyl is a $C_1$-$C_{1000}$ alkyl group, preferably a $C_{10}$-$C_{200}$ alkyl group), polyoxyethylene alkyl phenyl ether (wherein alkyl is a $C_1$-$C_{1000}$ alkyl group, preferably a $C_{10}$-$C_{200}$ alkyl group), polyoxyethylene secondary alcohol ether, polyoxyethylene-oxypropylene block copolymer, polyglycerin fatty acid ester, sorbitan fatty acid ester, and mixtures thereof.

The ink composition, according to the exemplary embodiments of the present invention, may include 0.1 to 5 parts by weight of the surfactant based on 100 parts by weight of the ink composition.

The wetting agent prevents clogging of the ink composition at the nozzles. The wetting agent may be a polyhydric alcohol. Examples of the wetting agent include glycerin, ethylene glycol, diethylene glycol, triethylene glycol, propylene glycol, dipropylene glycol, hexylene glycol, 1,3-butane diol, 1,4-butane diol, 1,5-pentane diol, 2-buten-1,4-diol, 2-methyl -2-pentane diol and mixtures thereof.

The ink composition, according to the exemplary embodiments of the present invention, may include 5 to 30 parts by weight of the wetting agent based on 100 parts by weight of the ink composition.

The ink composition, according to the exemplary embodiments of the present invention, may further comprise 0.5 to 40 parts by weight of at least one additive selected from the group consisting of a viscosity control agent, a surfactant, a storage stabilizer, a welting agent, a pH adjusting agent and a penetrant based on 100 parts by weight of the ink composition.

A method of preparing the ink composition according to the exemplary embodiments of the present invention will now be described.

The metal complex colorant and/or a conventional colorant, and if necessary, additives, such as a dispersing agent, a viscosity control and a surfactant, are mixed into a carrier medium, and then stirred to obtain a uniform ink composition. Then, the composition is passed through a 0.45 to 0.8 μm filter to obtain the ink composition according to the exemplary embodiments of the present invention.

The present invention will be described in more detail by presenting the following examples. These examples are for illustrative purposes only, and are not intended to limit the scope of the present invention. The following tests were used to evaluate the characteristics of ink. The tests may also be applied to wet-type toners, dry-type toners, coatings and/or coating solutions. An ink composition will be described as a representative embodiment of the composition comprising the metal complex colorant represented by formula 1. However, this is not meant to limit the scope of the present invention.

EXAMPLES

Synthesis Example 1

(1) 36.5 g of ACID RED 4 (E-$SO_3$Na), 300 ml of DMSO (dimethylsulfoxide) and 31.5 g of an azo compound having formula 4 below were placed in a 500 ml Erlenmeyer flask and melted. One or two boiling chips were introduced into the flask and 30 ml of concentrated sulfuric acid was slowly added. Then, the flask was connected to a reflux cooler and the mixture was refluxed at 80° C. for at least 8 hours. Next, the mixture was cooled to room temperature and an excess of methanol was added to form crystals, and then the crystals were filtered through a suction filter. To remove unreacted reactants, the filtered crystals were dissolved again in DMSO, methanol was added to form crystals, and the crystals were filtered through a suction filter. The filtered crystals were dried in an oven to obtain a colorant having formula 5 below (42.6 g).

(2) 34.2 g of the colorant having formula 5 below obtained in (1) and 13 g of an aqueous ammonia solution (30%) were added to 400 ml of ethylene glycol, and then 13 g of Co(CH$_3$COO)$_2$.4H$_2$O was added and then the mixture was mixed at 100° C. Then, 400 ml of hot water and 50 g of ammonium chloride were added to the solution and precipitated, filtered and washed. Subsequently, the product was dried in an oven to obtain a metal complex colorant (28 g).

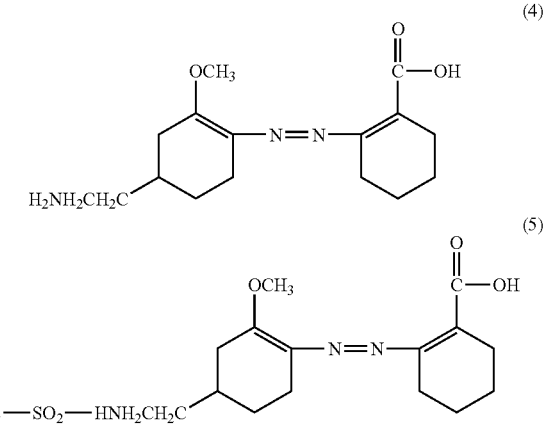

Synthesis Example 2

(1) 100 ml of DMSO and 21.2 g of an azo compound having formula 6 below were placed in a 500 ml Erlenmeyer flask and melted. 14.8 g of SOCl$_2$ was introduced into the flask, and the mixture reacted for one hour at room temperature to obtain a first solution. A solution of C.I. PIGMENT RED 177 (E-NH$_2$) (47.8 g) in 200 ml of DMSO was added to the first solution in the flask, and one or two boiling chips were introduced into the flask. Then, the flask was connected to a reflux cooler and the mixture was refluxed at 80° C. for at least 6 hours. Next, the mixture was cooled to room temperature, an excess of methanol was added to form crystals, and then the crystals were filtered through a suction filter. To remove unreacted reactants, the filtered crystals were dissolved again in DMSO, methanol was added to form crystals, and then the crystals were filtered through a suction filter. The filtered crystals were dried in an oven to obtain a colorant having formula 7 below (45.0 g).

(2) 20 g of ammonia and then 8.5 g of CuCl$_2$.2H$_2$O were added to 500 ml of to and melted. 31.5 g of the colorant having formula 7 below obtained in (1) was added to the resultant solution and mixed while heating to 80° C., and then 35 g of ammonium chloride and 150 ml of hot water were added to the mixture. Then, NaCl was added to the mixture to form precipitates. Then, the precipitates were filtered and dried in an oven to obtain a metal complex colorant (23.7 g).

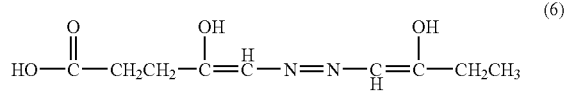

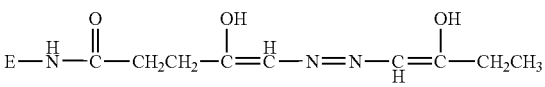

Synthesis Example 3

41.3 g of DIRECT BLACK 51 (E-COOH), 300 ml of DMSO and 25.0 g of an azo compound having formula 8 below were placed in a 500 ml Erlenmeyer flask and melted. One or two boiling chips were introduced into the flask, and 30 ml of concentrated sulfuric acid was slowly added. Then, the flask was connected to a reflux cooler and the mixture was refluxed at 80° C. for at least 8 hours. Next, the mixture was cooled to room temperature, an excess of methanol was added to form crystals, and then the crystals were filtered through a suction filter. To remove unreacted reactants, the filtered crystals were dissolved again in DMSO, methanol was added to form crystals, and then the crystals were filtered through a suction filter. The filtered crystals were dried in an oven to obtain a colorant having formula 9 below (42.2 g).

33.3 g of the colorant having formula below 9 obtained in (1) was dissolved in 150 ml of water and 10.7 g of CrCl$_3$.6H$_2$O was added. The resultant solution was refluxed at pH 3 for at least 6 hours. The solution was adjusted to pH 6 to form precipitates. Then, the precipitates were filtered and washed to obtain a metal complex colorant (25.5 g).

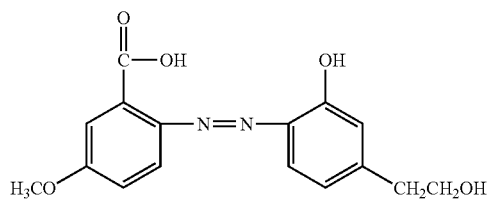

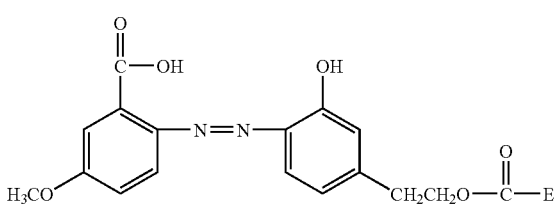

Synthesis Example 4

(1) A colorant having formula 10 below (54.3 g) was produced in the same manner as in Synthesis example 3 (1), except that 23.2 g of an azo compound having formula 6 was used instead of 25.0 g of an azo compound having formula 8 and 73.1 g of DIRECT BLACK 168 (E-OH) was used instead of 41.3 g of DIRECT BLACK 51 (E-COOH).

(2) 20 g of ammonia and then 6.8 g of CuCl$_2$.2H$_2$O were added to 500 ml of to and melted. 32.4 g of the colorant having formula 10 below obtained in (1) was added to the resultant solution and mixed while heating to 80° C., and then 35 g of ammonium chloride and 150 ml of hot water were added to the mixture. Then, NaCl was added to the mixture to form precipitates. Then, the precipitates were filtered and dried in an oven to obtain a metal complex colorant (27.5 g).

(10)

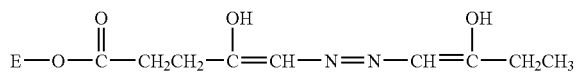

Synthesis Example 5

(1) 26.7 g of an azo compound having formula 11 was dissolved in 200 ml of DMSO in a 500 ml Erlenmeyer flask and 41.3 g of PIGMENT RED 177 (E-NH$_2$) was added to the resultant solution. Then, the mixture was treated at 120° C. for at least 12 hours, and the solution was concentrated. The concentrated solution was dissolved in ether, washed with distilled water several times, and then extracted to obtain an ether layer. Then, the ether layer was concentrated to obtain a colorant having formula 12 below (43.2 g).

(2) 29.6 g of a metal complex colorant was produced in the same manner as in Synthesis example 1 (2), except that 36.9 g of the colorant having formula 12 was used instead of 34.2 g of the colorant having formula 5 and 13.2 g of Co(CH$_3$COO)$_2$.4H$_2$O were used instead of 13 g of Co(CH$_3$COO)$_2$.4H$_2$O.

(11)

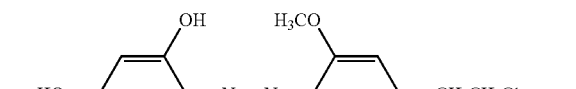

(12)

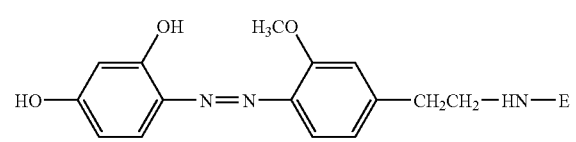

Synthesis Example 6

(1) A colorant having formula 14 below (45.2 9) was produced in the same manner as in Synthesis example 2 (1), except that 41.4 g of a colorant having formula 13 below was used instead of 21.2 g of an azo compound having formula 6 and 34.4 g of DIRECT BLACK 51 (E-NH$_2$) were used instead of 47.8 g of C.I. PIGMENT RED 177 (E-NH$_2$).

(2) 34.2 g of the colorant having formula 14 below obtained in (1) was dissolved in 150 ml of water and 9.2 g of CrCl$_3$.6H$_2$O was added to the solution. The resultant solution was refluxed at pH 3 for at least 6 hours. Then, the reaction solution was adjusted to pH 6 to form precipitates. The precipitates were filtered and washed to obtain a metal complex colorant (26.0 g).

(13)

(14)

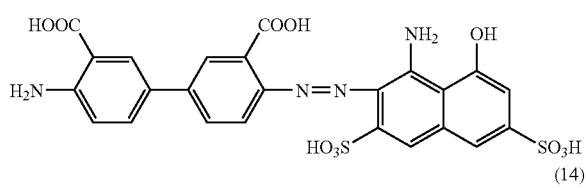

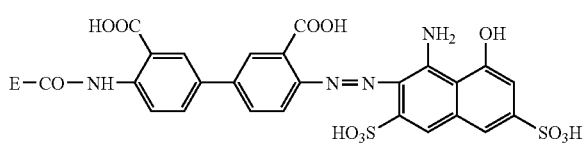

Example 1

Ink Composition

| | |
|---|---|
| Metal complex colorant in Synthesis example 1 (2) | 4 g |
| Water | 77 g |
| Isopropyl alcohol | 3 g |
| Ethylene glycol | 10 g |
| Glycerine | 6 g |

The above components were mixed and stirred well in a stirrer for at least 30 minutes until a uniform mixture was obtained. Then, the resultant product was filtered through a 0.45 μm filter to prepare an ink composition that includes a metal complex colorant according to an embodiment of the present invention.

Example 2

An ink composition was prepared in the same manner as in Example 1, except the metal complex colorant in Synthesis example 2 (2) was used instead of the metal complex colorant in Synthesis example 1 (2), 3.0 g of a dispersing agent, TEGO DISPERSE 750W was added while reducing the amount of water to 74 g, and a 0.8 μm filter was used instead of a 0.45 μm filter.

Example 3

An ink composition was prepared in the same manner as in Example 1, except the metal complex colorant in Synthesis example 3 (2) was used instead of the metal complex colorant in Synthesis example 1 (2).

Example 4

An ink composition was prepared in the same manner as in Example 1, except the metal complex colorant in Synthesis example 4 (2) was used instead of the metal complex colorant in Synthesis example 1 (2).

Example 5

An ink composition was prepared in the same manner as in Example 1, except the metal complex colorant in Synthesis example 5 (2) was used instead of the metal complex colorant in Synthesis example 1 (2), 3.0 g of a dispersing agent, TEGO DISPERSE 750W was added while reducing the amount of water to 74 g, and a 0.8 μm filter was used instead of a 0.45 μm filter.

Example 6

An ink composition was prepared in the same manner as in Example 1, except the metal complex colorant in Synthesis example 6 (2) was used instead of the metal complex colorant in Synthesis example 1 (2).

Comparative Example 1

An ink composition was prepared in the same manner as in Example 1, except that ACID RED 4 was used instead of the metal complex colorant in Synthesis example 1 (2).

Comparative Example 2

An ink composition was prepared in the same manner as in Comparative example 1, except that PIGMENT RED 177 was used instead of ACID RED 4 and a 0.8 μm filter was used instead of a 0.45 μm filter.

Comparative Example 3

An ink composition was prepared in the same manner as in Comparative example 1, except that DIRECT BLACK 51 was used instead of ACID RED 4.

Comparative Example 4

An ink composition was prepared in the same manner as in Comparative example 1, except that DIRECT BLACK 168 was used instead of ACID RED 4.

The characteristics of the ink compositions prepared in the above Examples and Comparative examples were measured according to the following methods.

Experimental Example 1

Test of Long-term Storage Stability 100 ml of the ink compositions obtained in Examples 1 through 6 and Comparative examples 1 through 4 were respectively placed in heat resistant glass bottles, sealed and then stored at 60° C. in a constant temperature bath. The bottles were left for 2 months and then it was confirmed whether precipitates formed at the bottoms of the bottles. The results are shown in Table 1.

0: no precipitate Δ: partially precipitated X: precipitated

TABLE 1

|  | Example | | | | | | Comparative example | | | |
|---|---|---|---|---|---|---|---|---|---|---|
|  | 1 | 2 | 3 | 4 | 5 | 6 | 1 | 2 | 3 | 4 |
| Storage stability | 0 | 0 | 0 | 0 | 0 | 0 | 0 | 0 | 0 | 0 |

Referring to Table 1, the ink compositions obtained using the metal complex colorant according to embodiments of the present invention (Examples 1 to 6) did not form precipitates and had effective storage stability, in comparison with the ink compositions obtained using the conventional colorants (Comparative examples 1 to 4)

Experimental Example 2

Test of Light Resistance

The ink compositions obtained in Examples 1 to 6 and Comparative examples 1 to 4 were respectively charged into a SAMSUNG ELECTRONICS CO., LTD. ink cartridge, and 2 cm×2 cm of solid patterns were printed using each ink in cartridge. The printed patterns were exposed to light in a Q-SUN Xenon Test Chamber for 100 hours. Subsequently, the changes in OD values before and after exposure were determined and estimated as follows. The results are shown in Table 2.

$A = OD$ (after exposure)$/OD$ (before exposure)$\times 100$ (%)

0A≧90%

Δ: 75≦A<90%

X: A<75%

TABLE 2

|  | Example | | | | | | Comparative example | | | |
|---|---|---|---|---|---|---|---|---|---|---|
|  | 1 | 2 | 3 | 4 | 5 | 6 | 1 | 2 | 3 | 4 |
| Light resistance | 0 | 0 | 0 | 0 | 0 | 0 | X | Δ | X | X |

Referring to Table 2, the ink compositions obtained using the metal complex colorant according to embodiments of the present invention in Examples 1 to 6 had more effective light resistance than the compositions obtained using the conventional colorants in Comparative examples 1 to 4. This demonstrates that the light resistance of the colorants was reinforced due to the formation of the metal complex.

Experimental Example 3

Test of Water Resistance

Solid patterns were printed in the same manner as in Experimental example 2 using the ink compositions obtained in Examples 1 to 6 and Comparative examples 1 to 4, respectively. After drying for one hour, each of the images was dipped into distilled water in a container for 5 minutes and removed from the container for drying. The changes of OD values before and after dipping into the distilled water were determined. The results are shown in Table 3.

0: the change is less than 20% with respective to the initial OD

X: the change is at least 20% with respect to the initial OD

TABLE 3

|  | Example | | | | | | Comparative example | | | |
|---|---|---|---|---|---|---|---|---|---|---|
|  | 1 | 2 | 3 | 4 | 5 | 6 | 1 | 2 | 3 | 4 |
| Water resistance | 0 | 0 | 0 | 0 | 0 | 0 | X | 0 | X | X |

Referring to Table 3, the ink compositions obtained using the metal complex colorant according to embodiments of the present invention in Examples 1 to 6 had more effective water resistance than that of the compositions obtained using the conventional colorants in Comparative examples 1 to 4. Thus, this demonstrates that the water resistance of the colorants was reinforced due to the formation of the metal complex.

The metal complex colorant according to an embodiment of the present invention represented by formula 1 may include a colorant which does not include a moiety capable of forming a coordinate bond with a metal, while colorants included in conventional metal complex colorants must include such a moiety. In addition, the metal complex colorant may embody various colors and have improved fastness, such as light resistance and water resistance.

The metal complex colorant according to embodiments of the present invention may be used in various fields employing colors, such as fibers, foods, drugs, cosmetics, coatings, inks or ceramics.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A coloring composition comprising a colorant, a carrier medium, and a metal complex colorant represented by formula 1:

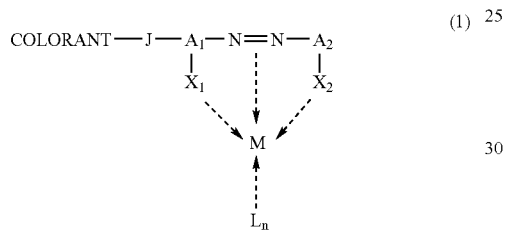

wherein each of $A_1$ and $A_2$ is independently a moiety which includes a substituted or unsubstituted $C_2$-$C_{30}$ alkenylene group having at least one double bond and is conjugated with an azo group;

each of $X_1$ and $X_2$ is selected from the group consisting of a hydroxy group, a $C_1$-$C_4$ alkoxy group, a carboxyl group, and a substituted or unsubstituted amino group;

M is a polyvalent transition metal;

L is a neutral or anionic ligand;

n is an integer from 1 to 3; and

J is a linker.

2. The coloring composition of claim 1, wherein the metal complex colorant is represented by one of formulas 2 and 3:

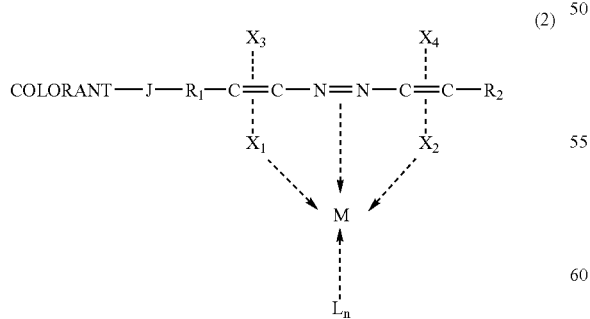

wherein:

$R_1$ is selected form the group consisting of a substituted or unsubstituted $C_1$-$C_{20}$ alkylene group, a substituted or unsubstituted $C_1$-$C_{20}$ heteroalkylene group, a substituted or unsubstituted $C_2$-$C_{20}$ alkenylene group, a substituted or unsubstituted $C_2$-$C_{20}$ heteroalkenylene group, a substituted or unsubstituted $C_6$-$C_{30}$ arylene group, and a substituted or unsubstituted $C_6$-$C_{30}$ heteroarylene group; and each of $X_3$, $X_4$ and $R_2$ is independently selected from the group consisting of a hydrogen atom, a halogen atom, a hydroxy group, a carboxyl group, a substituted or unsubstituted amino group, a sulfonic acid group, a phosphoric acid group, a substituted or unsubstituted $C_1$-$C_{20}$ alkyl group, a substituted or unsubstituted $C_1$-$C_{20}$ heteroalkyl group, a substituted or unsubstituted $C_2$-$C_{20}$ alkenyl group, a substituted or unsubstituted $C_2$-$C_{20}$ heteroalkenyl group, a substituted or unsubstituted $C_6$-$C_{30}$ aryl group, and a substituted or unsubstituted $C_6$-$C_{30}$ heteroaryl group; and

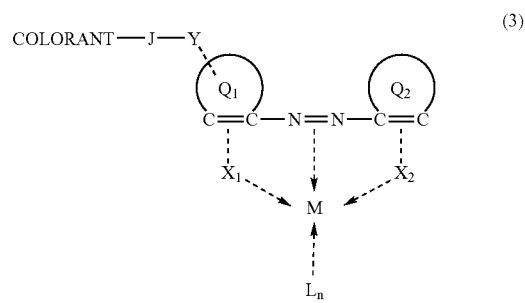

wherein:

each of $Q_1$ and $Q_2$ has at least one double bond and is independently selected from the group consisting of a substituted or unsubstituted $C_2$-$C_{20}$ cycloalkenylene group, a substituted or unsubstituted $C_6$-$C_{30}$ arylene group, a substituted or unsubstituted $C_2$-$C_{30}$ heterocycloalkenylene group, and a substituted or unsubstituted $C_4$-$C_{30}$ heteroarylene group; and Y is selected from the group consisting of —O—, —S—, —P—, an ester group, a substituted or unsubstituted imino group, a substituted or unsubstituted $C_1$-$C_{20}$ alkylene group, a substituted or unsubstituted $C_1$-$C_{20}$ heteroalkylene group, a substituted or unsubstituted $C_2$-$C_{20}$ alkenylene group, a substituted or unsubstituted $C_2$-$C_{20}$ heteroalkenylene group, a substituted or unsubstituted $C_6$-$C_{30}$ arylene group, and a substituted or unsubstituted $C_6$-$C_{30}$ heteroarylene group.

3. The coloring composition of claim 1, wherein the polyvalent transition metal is selected from the group consisting of silver, gold, cerium, cobalt, chromium, copper, europium, iron, indium, lanthanum, manganese, nickel, palladium, platinum, rhodium, ruthenium, scandium, samarium, titanium, uranium, zinc and zirconium.

4. The coloring composition of claim 1, wherein the neutral ligand is selected from the group consisting of ammonia, water, triphenylphosphine, *$NH_2$R"$NH_2$* (wherein R" is selected from the group consisting of a substituted or unsubstituted $C_1$-$C_{20}$ alkylene group, a substituted or unsubstituted $C_1$-$C_{20}$ heteroalkylene group, a substituted or unsubstituted $C_6$-$C_{30}$ arylene group, or a substituted or unsubstituted $C_4$-$C_{30}$ heteroarylene group), 2,2'-bipyridine, 1,10-phenanthroline, and 2,2,2"-terpyridine.

5. The coloring composition of claim 1, wherein the anionic ligand includes at least one selected from the group consisting of a halogen atom ion selected from the group consisting of $F^-$, $Cl^-$, $Br^-$, and $I^-$, $R''$—$NO_3$. (wherein $R''$ is selected from the group consisting of a substituted or unsubstituted $C_1$-$C_{20}$ alkyl group, a substituted or unsubstituted $C_1$-$C_{20}$ heteroalkyl group, a substituted or unsubstituted $C_6$-$C_{30}$ aryl, and a substituted or unsubstituted $C_4$-$C_{30}$ heteroaryl group), a substituted or unsubstituted $C_1$-$C_{20}$ alkylcarboxylate ion selected from the group consisting of acetate and trifluoroacetate, $R''CN^*$ (wherein $R''$ is selected from the group consisting of a substituted or unsubstituted $C_1$-$C_{20}$ alkyl group, a substituted or unsubstituted $C_1$-$C_{20}$ heteroalkyl group, a substituted or unsubstituted $C_6$-$C_{30}$ aryl group, a substituted or unsubstituted $C_4$-$C_{20}$ heteroaryl group, and —$(CH_2CH_2O)_z$— (wherein Z is a number between 1 and 50), $R''OO^*$ (wherein $R''$ is selected from the group consisting of a substituted or unsubstituted $C_1$-$C_{20}$ alkyl group, a substituted or unsubstituted $C_1$-$C_{20}$ heteroalkyl group, a substituted or unsubstituted $C_6$-$C_{30}$ aryl group, and a substituted or unsubstituted $C_4$-$C_{20}$ heteroaryl group), $R''O^*$ (wherein $R''$ is selected from the group consisting of a substituted or unsubstituted $C_1$-$C_{20}$ alkyl group, a substituted or unsubstituted $C_1$-$C_{20}$ heteroalkyl group, a substituted or unsubstituted $C_6$-$C_{30}$ aryl group, and a substituted or unsubstituted $C_4$-$C_{20}$ heteroaryl group), $R''SCN^*$ (wherein $R''$ is selected from the group consisting of a substituted or unsubstituted $C_1$-$C_{20}$ alkyl group, a substituted or unsubstituted $C_1$-$C_{20}$ heteroalkyl group, a substituted or unsubstituted $C_6$-$C_{30}$ aryl group, or a substituted or unsubstituted $C_4$-$C_{20}$ heteroaryl group), $R''SCN^*$ (wherein $R''$ is selected from the group consisting of a substituted or unsubstituted $C_1$-$C_{20}$ alkyl group, a substituted or unsubstituted $C_1$-$C_{20}$ heteroalkyl group, a substituted or unsubstituted $C_6$-$C_{30}$ aryl group, and a substituted or unsubstituted $C_4$-$C_{20}$ heteroaryl group), $R''N_3^*$ (wherein $R''$ is selected from the group consisting of a substituted or unsubstituted $C_1$-$C_{20}$ alkyl group, a substituted or unsubstituted $C_1$-$C_{20}$ heteroalkyl group, a substituted or unsubstituted $C_6$-$C_{30}$ aryl group, and a substituted or unsubstituted $C_4$-$C_{20}$ heteroaryl group), $R''CO_3^*$ (wherein $R''$ is selected from the group consisting of a substituted or unsubstituted $C_1$-$C_{20}$ alkyl group, a substituted or unsubstituted $C_1$-$C_{20}$ heteroalkyl group, a substituted or unsubstituted $C_6$-$C_{30}$ aryl group, and a substituted or unsubstituted $C_4$-$C_{20}$ heteroaryl group).

6. The coloring composition of claim 1, wherein the linker is selected from the group consisting of —O—, —NR—, —N=N—, —S—, —P—, —C(=O)—NR—, —NR—C(=O)—, —S(=O)(=O)O—, —C(=O)O—, —O—C(=O)—, —P(=O)O—, —C(=O)—O—C(=O)—, —C(=O)—S—C(=O)—, —C(=O)—NR—C(=O)—, —C(=N)—O—C(=N)—, —C(=S)—O—C(=S)—, —C(=N)—NR—C(=N)—, —C(=S)—NR—C(=S)—, —C(=N)—S—C(=N)— and —C(=S)—S—C(=S)— (wherein R is a hydrogen atom or a substituted or unsubstituted $C_1$-$C_4$ alkyl group), a single bond, and a double bond.

7. A coloring composition comprising a carrier medium, a metal complex colorant represented by formula 1:

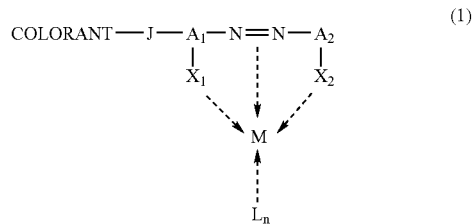

wherein each of $A_1$ and $A_2$ is independently a moiety which includes a substituted or unsubstituted $C_2$-$C_{30}$ alkenylene group having at least one double bond and is conjugated with an azo group;
each of $X_1$ and $X_2$ is selected from the group consisting of a hydroxy group, a $C_1$-$C_4$ alkoxy group, a carboxyl group, and a substituted or unsubstituted amino group;
M is a polyvalent transition metal;
L is a neutral or anionic ligand;
n is an integer from 1 to 3; and
J is a linker,
and
at least one additive selected from the group consisting of a dispersing agent, a viscosity control agent, a surfactant, a storage stabilizer and a wetting agent with a concentration of 0.5 to 40 parts by weight based on 100 parts by weight of the coloring composition.

8. The coloring composition of claim 7, wherein a concentration of the metal complex colorant is in a range of 1 to 20 parts by weight based on 100 parts by weight of the coloring composition.

9. The coloring composition of claim 7, wherein the carrier medium is water, at least one organic solvent, or a mixture of water and at least one organic solvent.

10. The coloring composition of claim 9, wherein when the carrier medium is a mixture of water and at least one organic solvent, the concentration of the organic solvent in the carrier medium is in a range of 5 to 50 parts by weight based on 100 parts by weight of the carrier medium.

11. The coloring composition of claim 9, wherein the organic solvent includes at least one selected from the group consisting of an alcohol compound selected from the group consisting of methyl alcohol, ethyl alcohol, n-propyl alcohol, isopropyl alcohol, n-butyl alcohol, sec-butyl alcohol, t-butyl alcohol and isobutyl alcohol; an aliphatic ketone compound selected from the group consisting of acetone, methyl ethyl ketone, diethyl ketone and diacetone alcohol; an ester compound selected from the group consisting of methyl acetate, ethyl acetate and ethyl lactate; a polyvalent alcohol compound selected from the group consisting of ethylene glycol, diethylene glycol, triethylene glycol, propylene glycol, butylene glycol, 1,4-butane diol, 1,2,4-butane triol, 1,5-pentane diol, 1,2,6-hexane triol, hexylene glycol, glycerol, glycerol ethoxylate and trimethylolpropane ethoxylate; an ether compound selected from the group of consisting of ethylene glycol monomethyl ether, ethylene glycol monoethyl ether, diethylene glycol methyl ether, diethylene glycol ethyl ether, triethylene glycol monomethyl ether and triethylene glycol monoethyl ether; a nitrogen-containing compound selected from the group consisting of 2-pyrolidone and N-methyl-2-pyrolidone; and a sulfur-containing compound selected from the group consisting of dimethyl sulfoxide, tetramethylsulfone and thioglycol.

12. The coloring composition of claim 1, wherein a concentration of the colorant is in a range of 1 to 15 parts by weight and a concentration of the metal complex colorant is in a range of 1 to 15 parts by weight based on 100 parts by weight of the coloring composition, and a total concentration of the colorant and the metal complex colorant is in a range of 2 to 20 based on 100 parts by weight of the coloring composition.

13. The coloring composition of claim 12, wherein the carrier medium is water, at least one organic solvent, or a mixture of water and at least one organic solvent.

14. The coloring composition of claim 13, wherein a concentration of the organic solvent in the carrier medium is in a range of 5 to 50 parts by weight based on 100 parts by weight of the carrier medium.

15. The coloring composition of claim 13, wherein the organic solvent includes at least one selected from the group consisting of an alcohol compound selected from the group consisting of methyl alcohol, ethyl alcohol, n-propyl alcohol, isopropyl alcohol, n-butyl alcohol, sec-butyl alcohol, t-butyl alcohol and isobutyl alcohol; an aliphatic ketone compound selected from the group consisting of acetone, methyl ethyl ketone, diethyl ketone and diacetone alcohol; an ester compound selected from the group consisting of methyl acetate, ethyl acetate and ethyl lactate; a polyvalent alcohol compound selected from the group consisting of ethylene glycol, diethylene glycol, triethylene glycol, propylene glycol, butylene glycol, 1,4-butane diol, 1,2,4-butane triol, 1,5-pentane diol, 1,2,6-hexane triol, hexylene glycol, glycerol, glycerol ethoxylate and trimethylolpropane ethoxylate; an ether compound selected from the group consisting of ethylene glycol monomethyl ether, ethylene glycol monoethyl ether, diethylene glycol methyl ether, diethylene glycol ethyl ether, triethylene glycol monomethyl ether and triethylene glycol monoethyl ether; a nitrogen-containing compound selected from the group consisting of 2-pyrolidone and N-methyl-2-pyrolidone; and a sulfur-containing compound selected from the group consisting of dimethyl sulfoxide, tetramethylsulfone and thioglycol.

16. The coloring composition of claim 1, further comprising at least one additive selected from the group consisting of a dispersing agent, a viscosity control agent, a surfactant, a storage stabilizer and a wetting agent with a concentration of 0.5 to 40 parts by weight based on 100 parts by weight of the coloring composition.

17. The coloring composition of claim 2, wherein the polyvalent transition metal is selected from the group consisting of silver, gold, cerium, cobalt, chromium, copper, europium, iron, indium, lanthanum, manganese, nickel, palladium, platinum, rhodium, ruthenium, scandium, samarium, titanium, uranium, zinc and zirconium.

18. The coloring composition of claim 2, wherein the neutral ligand is selected from the group consisting of ammonia, water, triphenylphosphine, *$NH_2R"NH_2$* (wherein R" is selected from the group consisting of a substituted or unsubstituted $C_1$-$C_{20}$ alkylene group, a substituted or unsubstituted $C_1$-$C_{20}$ heteroalkylene group, a substituted or unsubstituted $C_6$-$C_{30}$ arylene group, or a substituted or unsubstituted $C_4$-$C_{30}$ heteroarylene group), 2,2'-bipyridine, 1,10-phenanthroline, and 2,2',2"-terpyridine.

19. The coloring composition of claim 2, wherein the anionic ligand includes at least one selected from the group consisting of a halogen atom ion selected from the group consisting of $F^-$, $Cl^-$, $Br^-$, and $I^-$, R"—$NO_3$. (wherein R" is selected from the group consisting of a substituted or unsubstituted $C_1$-$C_{20}$ alkyl group, a substituted or unsubstituted $C_1$-$C_{20}$ heteroalkyl group, a substituted or unsubstituted $C_6$-$C_{30}$ aryl, and a substituted or unsubstituted $C_4$-$C_{30}$ heteroaryl group), a substituted or unsubstituted $C_1$-$C_{20}$ alkylcarboxylate ion selected from the group consisting of acetate and trifluoroacetate, R"CN* (wherein R" is selected from the group consisting of a substituted or unsubstituted $C_1$-$C_{20}$ alkyl group, a substituted or unsubstituted $C_1$-$C_{20}$ heteroalkyl group, a substituted or unsubstituted $C_6$-$C_{30}$ aryl group, a substituted or unsubstituted $C_4$-$C_{20}$ heteroaryl group, and —$(CH_2CH_2O)_z$— (wherein Z is a number between 1 and 50), R"OO* (wherein R" is selected from the group consisting of a substituted or unsubstituted $C_1$-$C_{20}$ alkyl group, a substituted or unsubstituted $C_1$-$C_{20}$ heteroalkyl group, a substituted or unsubstituted $C_6$-$C_{30}$ aryl group, and a substituted or unsubstituted $C_4$-$C_{20}$ heteroaryl group), R"O* (wherein R" is selected from the group consisting of a substituted or unsubstituted $C_1$-$C_{20}$ alkyl group, a substituted or unsubstituted $C_1$-$C_{20}$ heteroalkyl group, a substituted or unsubstituted $C_6$-$C_{30}$ aryl group, and a substituted or unsubstituted $C_4$-$C_{20}$ heteroaryl group), R"SCN* (wherein R" is selected from the group consisting of a substituted or unsubstituted $C_1$-$C_{20}$ alkyl group, a substituted or unsubstituted $C_1$-$C_{20}$ heteroalkyl group, a substituted or unsubstituted $C_6$-$C_{30}$ aryl group, or a substituted or unsubstituted $C_4$-$C_{20}$ heteroaryl group), R"$N_3$* (wherein R" is selected from the group consisting of a substituted or unsubstituted $C_1$-$C_{20}$ alkyl group, a substituted or unsubstituted $C_1$-$C_{20}$ heteroalkyl group, a substituted or unsubstituted $C_6$-$C_{30}$ aryl group, and a substituted or unsubstituted $C_4$-$C_{20}$ heteroaryl group), R"$CO_3$* (wherein R" is selected from the group consisting of a substituted or unsubstituted $C_1$-$C_{20}$ alkyl group, a substituted or unsubstituted $C_1$-$C_{20}$ heteroalkyl group, a substituted or unsubstituted $C_6$-$C_{30}$ aryl group, and a substituted or unsubstituted $C_4$-$C_{20}$ heteroaryl group), and R"$SO_4$* (wherein R" is selected from the group consisting of a substituted or unsubstituted $C_1$-$C_{20}$ alkyl group, a substituted or unsubstituted $C_1$-$C_{20}$ heteroalkyl group, a substituted or unsubstituted $C_6$-$C_{30}$ aryl group, and a substituted or unsubstituted $C_4$-$C_{20}$ heteroaryl group).

20. The coloring composition of claim 2, wherein the linker is selected from the group consisting of —O—, —NR—, —N=N—, —S—, —P—, —C(=O)—NR—, —NR—C(=O)—, —S(=O)(=O)O—, —C(=O)O—, —O—C(=O)—, —P(=O)O—, —C(=O)—O—C(=O)—, —C(=O)—S—C(=O)—, —C(=O)—NR—C(=O)—, —C(=N)—O—C(=N)—, —C(=S)—O—C(=S)—, —C(=N)—NR—C(=N)—, —C(=S)—NR—C(=S)—, —C(=N)—S—C(=N)— and —C(=S)—S—C(=S)— (wherein R is a hydrogen atom or a substituted or unsubstituted $C_1$-$C_4$ alkyl group), a single bond, and a double bond.

21. The coloring composition of claim 10, wherein the organic solvent includes at least one selected from the group consisting of an alcohol compound selected from the group consisting of methyl alcohol, ethyl alcohol, n-propyl alcohol, isopropyl alcohol, n-butyl alcohol, sec-butyl alcohol, t-butyl alcohol and isobutyl alcohol; an aliphatic ketone compound selected from the group consisting of acetone, methyl ethyl ketone, diethyl ketone and diacetone alcohol; an ester compound selected from the group consisting of methyl acetate, ethyl acetate and ethyl lactate; a polyvalent alcohol compound selected from the group consisting of ethylene glycol, diethylene glycol, triethylene glycol, propylene glycol, butylene glycol, 1,4-butane diol, 1,2,4-butane triol, 1,5-pentane diol, 1,2,6-hexane triol, hexylene glycol, glycerol, glycerol ethoxylate and trimethylolpropane ethoxylate; an ether compound selected from the group of consisting of ethylene glycol monomethyl ether, ethylene glycol monoethyl ether, diethylene glycol methyl ether, diethylene glycol ethyl ether, triethylene glycol monomethyl ether and triethylene glycol monoethyl ether; a nitrogen-containing compound selected from the group consisting of 2-pyrolidone and N-methyl-2-pyrolidone; and a sulfur-containing compound selected from the group consisting of dimethyl sulfoxide, tetramethylsulfone and thioglycol.

22. The coloring composition of claim 14, wherein the organic solvent includes at least one selected from the group consisting of an alcohol compound selected from the group consisting of methyl alcohol, ethyl alcohol, n-propyl alcohol, isopropyl alcohol, n-butyl alcohol, sec-butyl alcohol, t-butyl alcohol and isobutyl alcohol; an aliphatic ketone compound selected from the group consisting of acetone, methyl ethyl ketone, diethyl ketone and diacetone alcohol; an ester compound selected from the group consisting of methyl acetate, ethyl acetate and ethyl lactate; a polyvalent alcohol compound selected from the group consisting of ethylene glycol, diethylene glycol, triethylene glycol, propylene glycol, butylene glycol, 1,4-butane diol, 1,2,4-butane triol, 1,5-pentane diol, 1,2,6-hexane triol, hexylene glycol, glycerol, glycerol ethoxylate and trimethylolpropane ethoxylate; an ether compound selected from the group consisting of ethylene glycol monomethyl ether, ethylene glycol monoethyl ether, diethylene glycol methyl ether, diethylene glycol ethyl ether, triethylene glycol monomethyl ether and triethylene glycol monoethyl ether; a nitrogen-containing compound selected from the group consisting of 2-pyrolidone and N-methyl-2-pyrolidone; and a sulfur-containing compound selected from the group consisting of dimethyl sulfoxide, tetramethylsulfone and thioglycol.

23. The coloring composition of claim 2, wherein a concentration of the metal complex colorant is in a range of 1 to 20 parts by weight based on 100 parts by weight of the coloring composition.

24. The coloring composition of claim 2, wherein the carrier medium is water, at least one organic solvent, or a mixture of water and at least one organic solvent.

25. The coloring composition of claim 24, wherein when the carrier medium is a mixture of water and at least one organic solvent, the concentration of the organic solvent in the carrier medium is in a range of 5 to 50 parts by weight based on 100 parts by weight of the carrier medium.

26. The coloring composition of claim 2, further comprising at least one additive selected from the group consisting of a dispersing agent, a viscosity control agent, a surfactant, a storage stabilizer and a wetting agent with a concentration of 0.5 to 40 parts by weight based on 100 parts by weight of the coloring composition.

27. The coloring composition of claim 2, wherein a concentration of the colorant is in a range of 1 to 15 parts by weight and a concentration of the metal complex colorant is in a range of 1 to 15 parts by weight based on 100 parts by weight of the coloring composition, and a total concentration of the colorant and the metal complex colorant is in a range of 2 to 20 based on 100 parts by weight of the coloring composition.

28. The coloring composition of claim 27, wherein the carrier medium is water, at least one organic solvent, or a mixture of water and at least one organic solvent.

* * * * *

UNITED STATES PATENT AND TRADEMARK OFFICE
CERTIFICATE OF CORRECTION

PATENT NO.        : 7,364,597 B2                                           Page 1 of 1
APPLICATION NO.   : 10/912544
DATED             : April 29, 2008
INVENTOR(S)       : Yeon-kyoung Jung et al.

It is certified that error appears in the above-identified patent and that said Letters Patent is hereby corrected as shown below:

Column 17, Line 65, change "form" to --from--.

Column 18, Line 67, change "2,2,2"-" to --2,2',2"--.

Column 19, Line 4, change "R" -NO$_3$." to --R"-NO$_{3*}$--.

Column 19, Lines 36-41, after "group)," delete "R"SNC* (wherein R" is selected from the group consisting of a substituted or unsubstituted $C_1$-$C_{20}$ alkyl group, a substituted or unsubstituted $C_1$-$C_{20}$ heteroalkyl group, a substituted or unsubstituted $C_6$-$C_{30}$ aryl group, and a substituted or unsubstituted $C_4$-$C_{20}$ heteroaryl group),".

Column 19, Line 53, after "group)" delete "." and insert --, and R"SO$_4$* (wherein R" is selected from the group consisting of a substituted or unsubstituted $C_1$-$C_{20}$ alkyl group, a substituted or unsubstituted $C_1$-$C_{20}$ heteroalkyl group, a substituted $C_6$-$C_{30}$ aryl group, and a substituted or unsubstituted $C_4$-$C_{20}$ heteroaryl group).--.

Column 21, Line 65, change "R"-NO3." to --R"-NO$_{3*}$--.

Signed and Sealed this

Fourteenth Day of October, 2008

JON W. DUDAS
*Director of the United States Patent and Trademark Office*